Feb. 19, 1957   P. MAINARDI ET AL   2,781,691
STEREOSCOPIC VIEWER WITH COUPLED PICTURE
AND OCULAR ADJUSTING MEANS
Filed Jan. 31, 1952   3 Sheets-Sheet 1

INVENTORS:
POMPEY. MAINARDI AND
MARCUS N. MAINARDI
BY

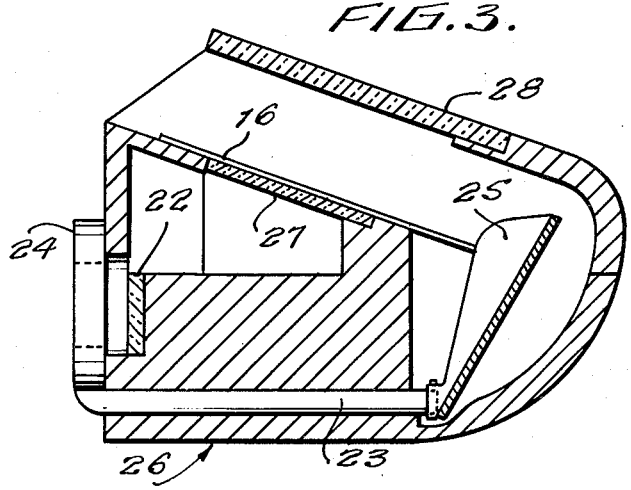
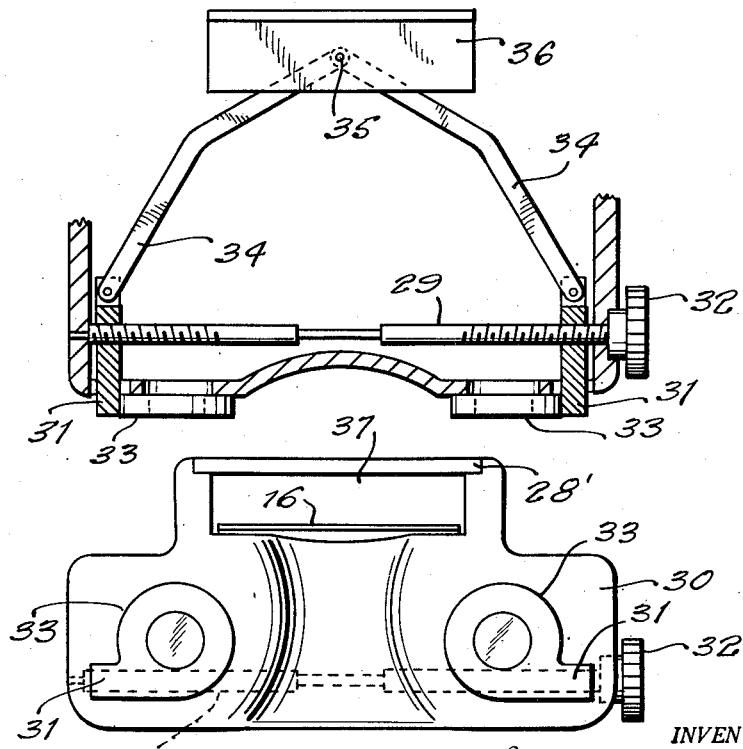

Feb. 19, 1957　　　P. MAINARDI ET AL　　　2,781,691
STEREOSCOPIC VIEWER WITH COUPLED PICTURE
AND OCULAR ADJUSTING MEANS
Filed Jan. 31, 1952　　　　　　　　　　　3 Sheets-Sheet 3
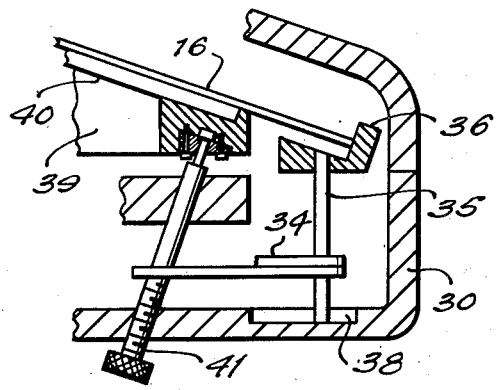
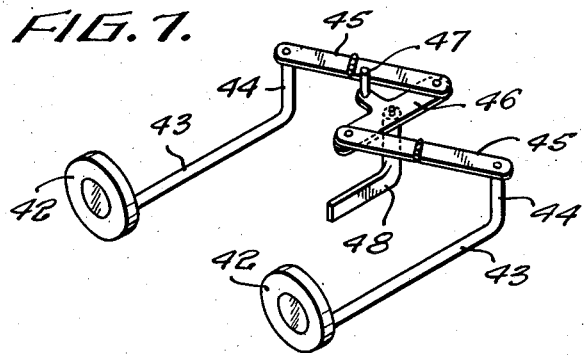
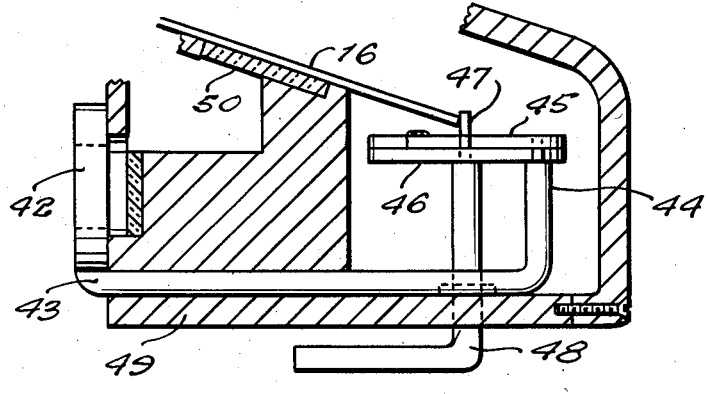
INVENTORS:
POMPEY MAINARDI AND
MARCUS N. MAINARDI
BY United States Patent Office 2,781,691
Patented Feb. 19, 1957

2,781,691

STEREOSCOPIC VIEWER WITH COUPLED PICTURE AND OCULAR ADJUSTING MEANS

Pompey Mainardi and Marcus N. Mainardi, Paterson, N. J.

Application January 31, 1952, Serial No. 269,172

11 Claims. (Cl. 88—29)

The present invention relates to a stereoscopic optical system.

More particularly, the present invention relates to apparatus for aligning a pair of complementary, stereoscopic images with respect to each other so that such images have a predetermined position with respect to each other. When the invention is applied to a projector for still or motion pictures, the images will be aligned so as to coincide with each other on a screen. When the invention is applied to a stereoscope, the images are aligned in accordance with the interpupillary distance of the observer. When the invention is applied to a camera for still or motion pictures, the images are respectively aligned with each half of a single film frame and parallax errors are eliminated. The alignment of the images, in accordance with the present invention, in a stereoscope or projector also eliminates parallax and eye strain.

One of the objects of the present invention is to provide a simple means for locating complementary, stereoscopic images in a desired position with respect to each other in a stereoscopic viewer, projector, or camera.

Another object of the present invention is to provide a stereoscopic viewer with means for automatically aligning the complementary, stereoscopic images with the interpupillary distance of the observer's eyes.

The present invention is particularly suitable for use with a combined diapositive composed of two complementary stereoscopic diapositive pictures which extend in head to head or tail to tail relation from a median, vertical dividing line of the diapositive.

With the above objects in view the present invention mainly consists of a device for photographically making, viewing, or projecting, on or from a picture carrier, a combined diapositive composed of two complementary, stereoscopic, diapositive pictures extending in head to head or tail to tail relation from a median, vertical dividing line of the diapositive. This device includes a beam splitting means for directing two halves of an incident beam, respectively containing the images of the two complementary stereoscopic pictures, outward in opposite directions from the incident beam. A beam deflecting means is located in the paths of the half beams and directs the two half beams along predetermined paths after rotating the images of the pictures in opposite directions through 90°. A support means is located opposite the beam splitting means for supporting the picture carrier for movement in its own plane in the direction of the dividing line of the diapositive.

When applied to a stereoscope, the present invention mainly consists of a viewer for stereoscopic viewing of a combined diapositive composed of two complementary, stereoscopic diapositive pictures extending in head to head or tail to tail relation from a median, vertical dividing line of the diapositive. This viewer includes a casing having a supporting surface for the combined diapositive. A pair of oculars are mounted on said casing for movement toward and away from each other, and an optical system is located between the supporting surface and oculars for projecting through the oculars, respectively, images, rotated in opposite directions through 90° of the pictures of a combined diapositive on the supporting surface. A moving means is located in the casing for moving the combined diapositive in its own plane along the supporting surface and in the direction of the diapositive dividing line.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 shows a side sectional view of a viewer having the construction shown in Fig. 2;

Fig. 4 is a fragmentary, partly section view of another embodiment of a viewer constructed in accordance with the present invention;

Fig. 5 is a front end view of a viewer having the structure shown in Fig. 4;

Fig. 6 is a fragmentary, side sectional view of the rear end portion of the viewer illustrated in Figs. 4 and 5;

Fig. 7 is a view of parts of a further embodiment of a viewer constructed in accordance with the present invention;

Fig. 8 is a fragmentary, side sectional view of a viewer having the structure of Fig. 7 mounted therein.

Figure 1:
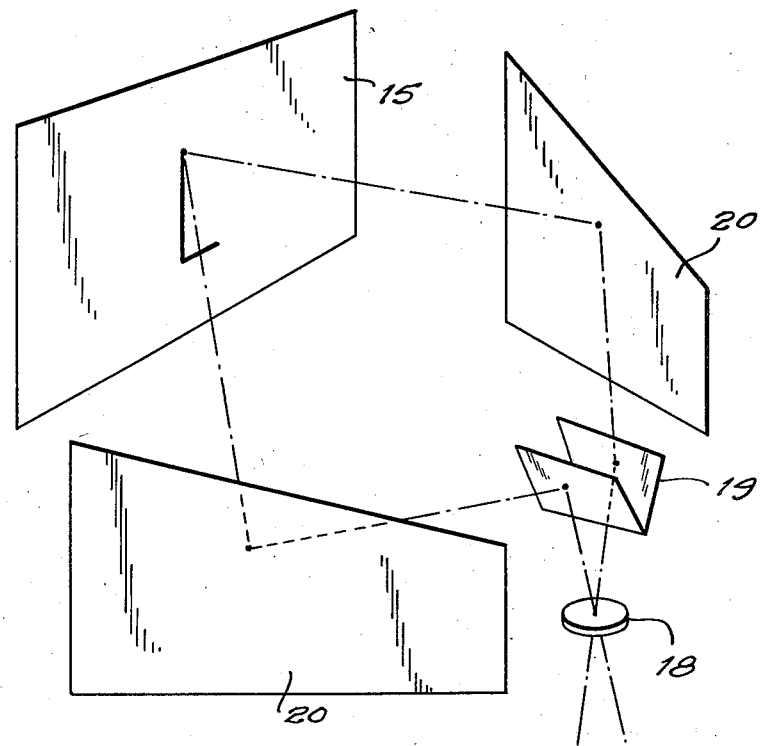
Fig. 1 shows a diagrammatic view of a projector constructed in accordance with the present invention.

Referring now to the drawings, there is diagrammatically illustrated in Fig. 1 a projector apparatus for projecting onto the screen 15 images from the combined diapositive 16, this diapositive 16 being composed of two complementary, stereoscopic diapositive pictures extending in tail to tail relation from a median, vertical dividing line 17 of the diapositive, these pictures being illustrated in Fig. 1 by the L's shown on the diapositive 16.

Located in front of the diapositive 16 is an objective 18 and located above the objective 18 is an optical system made up of a beam splitting means 19 and a beam deflecting means made up of the parts 20. In the particular example illustrated, the beam splitting means consists of two inclined mirrors which have their intersecting edges located directly in front of the objective 18, or it may consist of an isosceles or equilateral prism. The beam deflecting means 20 may simply be a pair of mirrors.

The mirrors 20 are located opposite the mirrors 19 and are mounted at a predetermined angle for providing a toe-in of the images so that they will coincide on the screen 15. Assuming that the parts 18—20 are in a predetermined fixed relationship with each other, it is evident that different degrees of toe-in will be required depending upon the distance of screen 15 from the optical system 18—20. In accordance with the present invention different degrees of toe-in may be provided in a very simple way by mounting the diapositive 16 for movement in its own plane and in the direction of the dividing line 17 thereof, as is diagrammatically shown by the arrow 20'. Thus, assuming that the projector and screen are located from each other at a distance which does not provide proper fusion of the two images on the screen, it is evident that by moving the diapositive in its own plane and in the direction of the dividing line 17, the toe-in may be varied so as to move the images on the screen 15 toward or away from each other until the desired fusion is obtained.

Of course, it is believed to be evident that substantially the same results could be obtained by moving the objective 18 with respect to the diapositive 16. In a projector, as well as in a viewer, it is most convenient to provide a means for moving the diapositive, as described above, in order to obtain proper fusion.

As is apparent from Fig. 1, the incident beam travelling to the beam splitting means 19 is divided into two half beams by the latter, each of these half beams carrying one of the complementary stereoscopic images. Each half beam is directed outwardly from the incident beam and is directed by one of the mirrors 20 of the beam deflecting means onto the screen 15, these mirrors 20 rotating the images in opposite directions through 90°.

Figure 2:
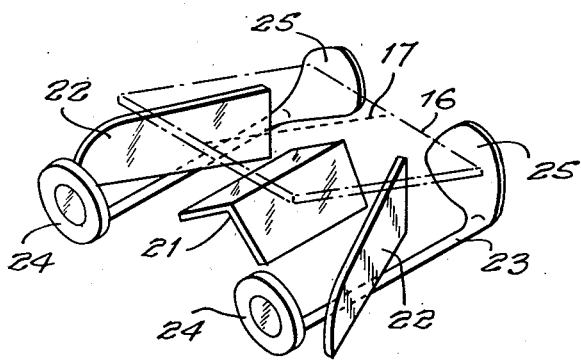
Fig. 2 shows a diagrammatic view of one possible embodiment of a viewer constructed in accordance with the present invention.
Figure 2:
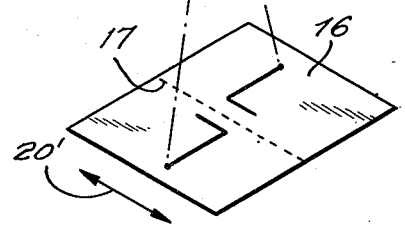

Fig. 2 diagrammatically illustrates the invention as applied to a viewer. The diapositive 16 is located on a supporting surface (not shown in Fig. 2) for movement in its own plane and in the direction of the dividing line 17. The viewer includes a beam splitting means 21, which in the particular example illustrated consists of a pair of mirrors similar to beam splitting means 19. A pair of mirrors 22, corresponding to mirrors 20 described above, are located on opposite sides of beam splitting means 21 at a predetermined fixed angle.

A pair of oculars 24 are located opposite each mirror 22 and are respectively mounted, at a peripheral portion thereof, on shafts 23 which are parallel to each other and mounted in the viewer for rotation about their axes. The ends of shafts 23 opposite from the oculars 24 respectively carry a pair of cams 25 fixedly mounted on the shafts 23 for rotation therewith. The cams 25 turn with the shafts 23, and the latter are turned when the operator moves the oculars 24 toward or away from each other. Since the oculars are eccentrically mounted on the shaft 23, the circular movement of the oculars results in a lateral displacement therebetween. This movement also results in a vertical movement of the oculars, but this vertical movement does not affect the viewer in any objectionable way.

The cams 25 are in engagement with an edge of the diapositive 16 and move the diapositive simultaneously with the movement of the oculars 24. The cams 25 are shaped so as to move the diapositive 16 toward the oculars when the latter are moved away from each other and through a distance equal to ½ of the relative movement of the oculars with respect to each other. In other words, the cams 25 move the diapositive through the same distance that each ocular moves. It is evident that if the oculars were fixed and the diapositive 16 were located at only one position in the viewer, it would be difficult for people having different interpupillary distances to use the viewer without a considerable amount of eye strain and in many cases the observer would see improperly fused images. This difficulty is entirely eliminated by the above described construction where the cams 25 move the diapositive toward the oculars as the latter are moved away from each other so that the viewer has no difficulty and experiences no eye strain after he adjusts the oculars 24 to his particular eye distance. It should be noted that if the oculars alone were made adjustable, while the diapositive remains stationary, it would still be very difficult for people having different interpupillary distances to view the images properly since the toe-in would not be constant for different observers.

Fig. 3 illustrates one practical embodiment of a viewer having the above described features. As is shown in Fig. 3, the shaft 23 is mounted for rotation about its own axis in a casing 26, this shaft 23 having one end extending beyond the casing and an opposite end located within the casing. The cam 25 is fixed to this opposite end of the shaft 23, and the ocular 24 is fixed at a peripheral portion thereof to the left-hand end of shaft 23, as viewed in Fig. 3. The casing 26 is provided with a supporting plate 27 for supporting the diapositive 16, this supporting plate being in the form of a transparent material, such as glass, and the optical system 21, 22 is located between the plate 27 and the oculars 24. Over the supporting surface 27 there is located a frosted glass member 28. Thus, as the oculars 24 are moved away from each other, the cams 25 engage diapositive 16 to move it in its own plane, on supporting surface 27, in the direction of dividing line 17 thereof so as to move the diapositive 16 by a distance which is proportional to the movement of oculars 24 away from each other and thereby automatically locate the diapositive 16 in the proper position for particular interocular distance of the viewer. It is apparent, of course, that any suitable device may be provided for moving the oculars 24 simultaneously toward or away from each other, and any suitable means may be provided to hold the diapositive 16 against cams 25 for movement in both directions therewith. This latter feature is not particularly important since the supporting plate 27 is slightly inclined, and the user may hold the viewer tilted downwardly so that the diapositive 16 will always rest against the cams 25 by the force of gravity.

As was mentioned above, any suitable means may be provided for simultaneously moving the oculars toward and away from each other, and one such means is illustrated in Fig. 4 where a shaft 29 is mounted for rotation in the viewer casing 30. This shaft 29 has opposite end portions which are oppositely threaded and which carry a pair of nut members 31. A handle 32 is connected to the shaft 29 to rotate the same and is located on the exterior of the casing 30. Thus, as the shaft 29 is rotated, the nuts 31 move toward or away from each other simultaneously and by the same amounts.

A pair of oculars 33 are respectively fixed to the nuts 31 for movement therewith. Link members 34 are pivotally connected to nuts 31, respectively, and may be bowed slightly to clear the picture area, members 34 also being linked to a pin 35 mounted in the casing for movement toward and away from the oculars and carrying a diapositive moving member 36. Thus, with the embodiment illustrated in Fig. 4 it is only necessary to turn the handle 32 to adjust the interocular distance of the viewer and at the same time automatically locate the diapositive in its proper position.

Fig. 5 shows a front end view of the viewer of Fig. 4. The casing 30 is provided in its front wall with a central indentation to accommodate the nose of the user and with an opening 37 through which a diapositive is set into and removed from the viewer, the diapositive 16 being shown in Fig. 5 in position in the viewer. As is shown in Fig. 5, the opening 37 is covered at its top by a frosted glass member 28'. The viewer of Figs. 4 and 5 is provided with an optical system identical with that described above in connection with Figs. 2 and 3.

Fig. 6 shows a fragmentary side sectional view of the rear end of the viewer of Figs. 4 and 5. As is apparent from Fig. 6, the pin 35 which supports the diapositive moving member 36 has an end thereof located in a groove 38 in the lower part of casing 30 so that when handle 32 is turned the links 34 may move the pin 35 toward and away from the oculars 33 and in this way impart a similar movement to diapositive 16.

Although the position of diapositive 16, as determined by the above described structure, will in most cases be satisfactory for most people, a user with eyesight that is not normal may wish to have a focusing adjustment in order to see the images properly. Such an adjustment is illustrated in Fig. 6 where the portion 39, of casing 30, which supports the transparent supporting plate 40 is adjustable in a direction normal to plate 40 through the medium of a screw member 41 which threadedly engages the casing 30 and rotatably engages portion 39 thereof. The rear face of the diapositive moving member 36 also is normal to the plane of plate 40. The knurled head of screw 41 extends from the lower surface of the viewer so that the user need only turn the screw 41 to obtain a translational movement of the diapositive 16 in a direction normal to its own plane and in this way focus the apparatus for his own particular vision. Similar results could be obtained by mounting the oculars 33 for horizontal movement. Thus, for example, in the above described embodiment shown in Figs. 2 and 3, the oculars 24 could be adjustably mounted on the shafts 23 for focusing purposes, and it is also believed to be apparent that the focusing structure shown in Fig. 6 is equally usable in the other embodiments of viewers described above and below.

Fig. 7 of the drawing illustrates a still further possible way of obtaining automatic relocation of the diapositive together with a simultaneous adjustment of the interocular distance. In Fig. 7, the oculars 42 are fixedly mounted, at peripheral portions thereof, on the parallel shafts 43 which are mounted for rotation about their axes and which have upwardly bent, end portions 44. These end portions 44 are each connected to a link 45, these links each being made of a pair of hinged sections to accommodate turning movement of end portions 44. The links 45 are connected to a T-shaped plate member 46 which carries a cam pin 47 and which is eccentrically mounted on an L-shaped lever 48. Thus, when the lever 48 is turned about a vertical axis, as viewed in Fig. 7, the cam 47 turns and moves a diapositive located thereagainst, while the links 45 simultaneously turn the shafts 43 so as to adjust the interocular distance of the viewer.

The above described structure is shown in Fig. 8 where one of the shafts 43 is shown turnably mounted in the viewer casing 49 and where the cam pin 47 is shown in engagement with a diapositive 16 located on the transparent supporting plate 50. The same optical system as was described above in connection with Figs. 2 and 3 is located between plate 60 and oculars 42. The L-shaped lever 48 extends through the bottom wall of casing 49 so as to be accessible to the user who simply turns this lever to simultaneously adjust the position of the diapositive 16 and the interocular distance of the viewer. Thus, the embodiment of the invention illustrated in Figs. 7 and 8 is capable of producing the same results which are produced by the structures described above.

It will be understood that each of the elements described above, or two or more together, may also find a useful application in other types of stereoscopic systems differing from the types described above.

While the invention has been illustrated and described as embodied in stereoscopic optical systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A viewer for stereoscopic viewing of a combined diapositive composed of two complementary, stereoscopic diapositive pictures extending in head to head or tail to tail relation from a median, vertical dividing line of the diapositive, comprising, in combination, a casing having a supporting surface for the combined diapositive; a pair of oculars mounted on said casing for movement toward and away from each other; an optical system located between said supporting surface and said oculars for projecting through said oculars, respectively, images, rotated in opposite directions through 90°, of the pictures of a combined diapositive on said supporting surface; and moving means located in said casing for moving the combined diapositive in its own plane along said supporting surface and in the direction of the diapositive dividing line, said moving means being operatively connected to at least one of said oculars to automatically move the combined diapositive through a distance proportional to the extent of movement of said oculars toward or away from each other.

2. A viewer for stereoscopic viewing of a combined diapositive composed of two complementary, stereoscopic diapositive pictures extending in head to head or tail to tail relation from a median, vertical dividing line of the diapositive, comprising, in combination, a casing having a supporting surface for the combined diapositive; a pair of oculars mounted on said casing for movement toward and away from each other; an optical system located between said supporting surface and said oculars for projecting through said oculars, respectively, images, rotated in opposite directions through 90°, of the pictures of a combined diapositive on said supporting surface; focusing means located in said casing for focusing the combined diapositive; and moving means located in said casing for moving the combined diapositive in its own plane along said supporting surface and in the direction of the diapositive dividing line, said moving means being operatively connected to at least one of said oculars to automatically move the combined diapositive through a distance proportional to the extent of movement of said oculars toward or away from each other.

3. A viewer for stereoscopic viewing of a combined diapositive composed of two complementary, stereoscopic diapositive pictures extending in head to head or tail to tail relation from a median, vertical dividing line of the diapositive, comprising, in combination, a casing having a supporting surface for the combined diapositive; a pair of oculars eccentrically mounted on said casing for turning movement about a pair of parallel axes so that said oculars may be moved toward or away from each other; an optical system located between said supporting surface and said oculars for projecting through said oculars, respecitvely, images, rotated in opposite directions through 90°, of the pictures of a combined diapositive on said supporting surface; and at least one cam having a portion located opposite an end of said supporting surface and being connected to one of said oculars for turning movement therewith so that when said oculars are turned with respect to each other said cam will engage a diapositive on said supporting surface to move the same through a distance proportional to the extent of movement of said one ocular.

4. A viewer for stereoscopic viewing of a combined diapositive composed of two complementary, stereoscopic diapositive pictures extending in head to head or tail to tail relation from a median, vertical dividing line of the diapositive, comprising, in combination, a casing having a transparent supporting surface for the combined diapositive; a frosted glass member located over said supporting surface to cover a combined diapositive located thereon; a pair of oculars eccentrically mounted on said casing for turning movement about a pair of parallel axes so that said oculars may be moved toward or away from each other; an optical system located between said supporting surface and said oculars for projecting through said oculars, respectively, images, rotated in opposite directions through 90°, of the pictures of a combined diapositive on said supporting surface; and at least one cam having a portion located opposite an end of said supporting surface and being connected to one of said oculars for turning movement therewith so that when said oculars are turned with respect to each other said cam will engage a diapositive on said supporting surface to move the same through a distance proportional to the extent of movement of said one ocular.

5. A viewer for stereoscopic viewing of a combined diapositive composed of two complementary, stereoscopic diapositive pictures extending in head to head or tail to tail relation from a medium, vertical dividing line of the diapositive, comprising, in combination, a casing having a supporting surface for the combined diapositive; a pair of spaced, parallel shafts mounted in said casing for turning movement about their axes and each having one end portion extending beyond said casing and an opposite end portion located within said casing; a pair of oculars respectively fixed at a peripheral portion thereof on said one end portion of said shafts so that said oculars may be turned about said shaft axes to be moved toward and away from each other; an optical system located between said supporting surface and said oculars for projecting through said oculars, respectively, images, rotated in opposite directions through 90°, of the pictures of a combined diapositive on said supporting surface; and a pair of cams respectively fixed to said opposite end portions of said shafts so as to rotate therewith and each having a portion located opposite an end of said supporting so that when said oculars are turned toward or away from each other said cams will engage a diapositive on said supporting surface to move the same through a distance proportional to the extent of movement of said oculars with respect to each other.

6. A viewer for stereoscopic viewing of a combined diapositive composed of two complementary, stereoscopic diapositive pictures extending in head to head or tail to tail relation from a median, vertical dividing line of the diapositive, comprising, in combination, a casing having a supporting surface for the combined diapositive; a shaft rotatably mounted in said casing and having, adjacent opposite ends thereof, oppositely threaded portions; a pair of nut members respectively mounted on said oppositely threaded portions of said shaft; a pair of oculars respectively fixed to said nut members for movement therewith toward and away from each other upon rotation of said shaft; an optical system located between said supporting surface and said oculars for projecting through said oculars, respectively, images, rotated in opposite directions through 90°, of the pictures of a combined diapositive on said supporting surface; a moving member located opposite an end of said supporting surface and being mounted in said casing for movement toward and away from said supporting surface; and linkage means connected to at least one of said nut members and said moving member for moving the latter through a distance proportional to the extent of movement of said nut members, so that said moving member will move a diapositive on said supporting surface through a distance proportional to the movement of said oculars.

7. A viewer for stereoscopic viewing of a combined diapositive composed of two complementary stereoscopic diapositive pictures extending in head to head or tail to tail relation from a median, vertical dividing line of the diapositive, comprising, in combination, a casing having a supporting surface for the combined diapositive; a shaft rotatably mounted in said casing and having, adjacent opposite ends thereof, oppositely threaded portions; a pair of nut members respectively mounted on said oppositely threaded portions of said shaft; a pair of oculars respectively fixed to said nut members for movement therewith toward and away from each other upon rotation of said shaft; an optical system located between said supporting surface and said oculars for projecting through said oculars, respectively, images, rotated in opposite directions through 90°, of the pictures of a combined diapositive on said supporting surface; a moving member located opposite an end of said supporting surface and being mounted in said casing for movement toward and away from said supporting surface; linkage means connected to at least one of said nut members and said moving member for moving the latter through a distance proportional to the extent of movement of said nut members, so that said moving member will move a diapositive on said supporting surface through a distance proportional to the movement of said oculars; and focusing means located in said casing for focusing a diapositive mounted on said supporting surface of said casing.

8. A viewer for stereoscopic viewing of a combined diapositive composed of two complementary, stereoscopic diapositive pictures extending in head to head or tail to tail relation from a median, vertical dividing line of the diapositive, comprising, in combination, a casing having a movable support member for the combined diapositive; a shaft rotatably mounted in said casing and having, adjacent opposite ends thereof, oppositely threaded portions; a pair of nut members respectively mounted on said oppositely threaded portions of said shaft; a pair of oculars respectively fixed to said nut members for movement therewith toward and away from each other upon rotation of said shaft; an optical system located between said movable support member and said oculars for projecting through said oculars, respectively, images, rotated in opposite directions through 90°, of the pictures of a combined diapositive on said supporting surface; a moving member located opposite an end of said supporting surface and being mounted in said casing for movement toward and away from said movable support member; linkage means connected to at least one of said nut members and said moving member for moving the latter through a distance proportional to the extent of movement of said nut members, so that said moving member will move a diapositive on said movable support member through a distance proportional to the movement of said oculars; and focusing means located in said casing for focusing a diapositive mounted on said movable support member of said casing, said focusing means comprising a screw member threadedly mounted on said casing and engaging said support member to move the same so as to focus a diapositive in said casing.

9. A viewer for stereoscopic viewing of a combined diapositive composed of two complementary, stereoscopic diapositive pictures extending in head to head or tail to tail relation from a median, vertical dividing line of the diapositive, comprising, in combination, a casing having a supporting surface for the combined diapositive; a pair of spaced, parallel shafts mounted in said casing for turning movement about their axes and each having one end portion extending beyond said casing and an opposite end portion located within said casing; a pair oculars respectively fixed at a peripheral portion thereof on said one end portions of said shafts so that said oculars may be turned about said shaft axes to be moved toward and away from each other; an optical system located between said supporting surface and said oculars for projecting through said oculars, respectively, images, rotated in opposite directions through 90°, of the pictures of a combined diapositive on said supporting surface; a cam located in said casing opposite an end of said supporting surface and being turnably mounted in said casing so that said cam may engage and move a diapositive on said supporting surface with respect to said optical system; and linkage means connected to said cam and at least one of said shafts to turn the latter about its axis upon turning of said cam so as to correlate the movement of the diapositive with the interocular distance of the viewer.

10. A viewer for stereoscopic viewing of a combined diapositive composed of two complementary, stereoscopic diapositive pictures extending in head to head or tail to tail relation from a median, vertical dividing line of the diapositive, comprising, in combination, a casing having a supporting surface for the combined diapositive; a pair of spaced, parallel shafts mounted in said casing for turning movement about their axes and each having one end portion extending beyond said casing and an opposite end portion located within said casing; a pair of oculars respectively fixed at a peripheral portion thereof on said one end portions of said shafts so that said oculars may be turned about said shaft axes to be moved toward and away from each other; an optical system located between said supporting surface and said oculars for projecting through said oculars, respectively, images, rotated in opposite directions through 90°, of the pictures of a combined diapositive on said supporting surface; a cam located in said casing opposite an end of said supporting surface and being turnably mounted in said casing so that said cam may engage and move a diapositive on said supporting surface with respect to said optical system; and linkage means connected to said cam and said shafts to simultaneously turn the latter in opposite directions about their axes upon turning of said cam so as to correlate the movement of the diapositive with the interocular distance of the viewer.

11. A viewer for stereoscopic viewing of a combined diapositive composed of two complementary, stereoscopic diapositive pictures extending in head to head or tail to tail relation from a median, vertical dividing line of the diapositive, comprising, in combination, a casing having a supporting surface for the combined diapositive; a pair of spaced, parallel shafts mounted in said casing for turning movement about their axes and each having one end portion extending beyond said casing and an opposite end portion located within said casing; a pair of oculars respectively fixed at a peripheral portion thereof on said one end portions of said shafts so that said oculars may be turned about said shaft axes to be moved toward and away from each other; an optical system located between said supporting surface and said oculars for projecting through said oculars, respectively, images, rotated in opposite directions through 90°, of the pictures of a combined diapositive on said supporting surface; a cam located in said casing opposite an end of said supporting surface and being turnably mounted in said casing so that said cam may engage and move a diapositive on said supporting surface with respect to said optical system; a lever connected to said cam for turning the same and having a portion located outside of said casing so that the operator may turn said lever and cam therewith; and linkage means connected to said cam and at least one of said shafts to turn the latter about its axis upon turning of said cam so as to correlate the movement of the diapositive with the interocular distance of the viewer.

References Cited in the file of this patent

UNITED STATES PATENTS

| | | |
|---|---|---|
| 1,579,025 | Owens | Mar. 30, 1926 |
| 2,033,902 | Van Albada | Mar. 10, 1936 |
| 2,298,586 | Phillips | Oct. 13, 1942 |
| 2,313,561 | Mainardi et al. | Mar. 9, 1943 |
| 2,313,562 | Mainardi et al. | Mar. 9, 1943 |
| 2,403,733 | Mainardi et al. | July 9, 1946 |
| 2,595,409 | Reijnders | May 6, 1952 |
| 2,693,128 | Dewhurst | Nov. 2, 1954 |

FOREIGN PATENTS

| | | |
|---|---|---|
| 491,478 | Great Britain | Nov. 30, 1936 |
| 649,777 | Great Britain | Jan. 31, 1951 |

OTHER REFERENCES

Judge: "Stereoscopic Photography," third edition, 1950; published in London, England; pages 145 and 146 cited.